United States Patent
Kimura

(10) Patent No.: US 9,327,777 B2
(45) Date of Patent: May 3, 2016

(54) BOUNDARY LAYER CONTROL SYSTEM

(71) Applicant: Yukihide Kimura, Gotenba (JP)

(72) Inventor: Yukihide Kimura, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/351,376

(22) PCT Filed: Oct. 11, 2012

(86) PCT No.: PCT/IB2012/002017
§ 371 (c)(1),
(2) Date: Apr. 11, 2014

(87) PCT Pub. No.: WO2013/054171
PCT Pub. Date: Apr. 18, 2013

(65) Prior Publication Data
US 2014/0265432 A1    Sep. 18, 2014

(30) Foreign Application Priority Data

Oct. 13, 2011    (JP) .................................. 2011-226017

(51) Int. Cl.
*B62D 35/02* (2006.01)
*B62D 37/02* (2006.01)
*F15D 1/12* (2006.01)

(52) U.S. Cl.
CPC ................ *B62D 35/02* (2013.01); *B62D 37/02* (2013.01); *F15D 1/12* (2013.01)

(58) Field of Classification Search
CPC ...... B62D 35/007; B62D 35/02; B62D 37/02; F15D 1/12

USPC ........................................................ 296/180.1
See application file for complete search history.

(56) References Cited

U.S. PATENT DOCUMENTS

2008/0252099 A1    10/2008    Terry et al.

FOREIGN PATENT DOCUMENTS

| DE | 1026629 B | | 3/1958 |
|---|---|---|---|
| EP | 1752364 A1 | * | 2/2007 |
| GB | 2269142 A | * | 2/1994 |
| GB | 2344854 A | | 6/2000 |
| JP | 04-083983 U | | 7/1992 |
| JP | 04-339079 A | | 11/1992 |
| JP | 10-281115 A | | 10/1998 |
| JP | 2007-022488 A | | 2/2007 |
| JP | 2009-504472 A | | 2/2009 |

* cited by examiner

*Primary Examiner* — Glenn Dayoan
*Assistant Examiner* — Melissa A Black
(74) *Attorney, Agent, or Firm* — Kenyon & Kenyon LLP

(57) ABSTRACT

A boundary layer control system includes a boundary layer separating portion that separates a boundary layer of an airflow at an underside of a body of a moving object from a main flow of the airflow, and an ejecting portion that ejects fluid in a state different from that of the boundary layer and the main flow, between the boundary layer and the main flow that have been separated by the boundary layer separating portion. This boundary layer control system is characterized in that boundary layer and the main flow are reliably separated by the fluid in a state different from that of the boundary layer and the main flow, so the percentage of the main flow that is slowed down (i.e., reduced in velocity) by the boundary layer is reduced.

8 Claims, 3 Drawing Sheets

BOUNDARY LAYER CONTROL SYSTEM

CROSS-REFERENCE TO RELATED APPLICATIONS

This is a national phase application based on the PCT International Patent Application No. PCT/IB2012/002017 filed on Oct. 11, 2012, claiming priority to Japanese application No. 2011-226017 filed Oct. 13, 2011, the entire contents of both of which are incorporated herein by reference.

BACKGROUND OF THE INVENTION

1. Field of the Invention

The invention relates to boundary layer control system.

2. Description of Related Art

Technology exists for increasing the stability of a vehicle body by increasing negative lift (i.e., down force). It is known that increasing the velocity of air that flows under the vehicle body increases this down force. However, the velocity of air that flows under the vehicle body decreases, and consequently down force decreases, as a result of a low-velocity layer called a boundary layer that forms near the surface of the vehicle. Therefore, with a boundary layer suction system described in Published Japanese Translation of PCT application No. 2009-504472 (JP-A-2009-504472), down force is ensured by sucking in the boundary layer near the floor surface.

However, with the boundary layer suction system described in JP-A-2009-504472, the boundary layer of the airflow is unable to be reliably separated from the main flow of the airflow at the surface of the vehicle body, so the boundary layer and the main flow may end up reattaching. If the boundary layer and the main flow reattach, the velocity of the main flow will decrease due to the boundary layer, so the down force will decrease, which may influence a stability of the vehicle body.

SUMMARY OF THE INVENTION

Therefore, in view of the foregoing problem, the invention provides a boundary layer control system capable of inhibiting a decrease in velocity of a main flow of an airflow at a body surface of a moving object.

A first aspect of the example embodiment relates to a boundary layer control system that includes a boundary layer separating portion that separates a boundary layer of an airflow at a surface of a body of a moving object from a main flow of the airflow, and an ejecting portion that ejects fluid in a state different from that of the boundary layer and the main flow, between the boundary layer and the main flow that have been separated by the boundary layer separating portion.

In this boundary layer control system, the main flow is able to be inhibited from reattaching to (also referred to as converting or mixing with) the boundary layer by forming a layer with fluid in a state different from that of the boundary layer and the main flow, between the main flow and the boundary layer of the airflow at the surface of the body of the moving object. As a result, a decrease in velocity of the main flow at the surface of the body of the moving object is able to be suppressed, so resistance from the airflow is able to be reduced. For example, a decrease in down force can be suppressed at the surface of the underside of a vehicle.

Also, the ejecting portion may eject fluid in which at least one of a fluid velocity, a fluid pressure, and a fluid temperature is different from that of the boundary layer and the main flow, between the boundary layer and the main flow. In this case, the main flow and the boundary layer of the airflow at the surface of the body are able to be separated from one another, and the main flow is able to be inhibited from reattaching to the boundary flow, by fluid in which at least one of the fluid velocity, the fluid pressure, and the fluid temperature is different from that of the main flow and the boundary layer of the airflow at the surface of the body.

Also, the boundary layer control system may also include a suction portion that is provided behind the boundary layer separating portion in a longitudinal direction of the moving object, and sucks in fluid included in the boundary layer. Also, the ejecting portion may eject the fluid sucked in by the suction portion, between the boundary layer and the main flow. In this case, fluid included in the boundary layer of the airflow at the surface of the body is able to be circulated, so it is no longer necessary to discharge the sucked in fluid.

Also, the boundary layer control system may also include a control portion that controls the state of the fluid sucked in by the suction portion and supplies the resultant fluid to the ejecting portion. Also, the control portion may compress the fluid sucked in by the suction portion, based on the state of the boundary layer. Further, the control portion may heat the fluid sucked in by the suction portion, based on the state of the boundary layer. Also, the control portion may control the ejecting portion to change a direction in which the fluid is ejected, based on the state of the boundary layer. In this case, the main flow and the boundary layer of the airflow at the surface of the body are able to be even further inhibited from reattaching to each other by controlling the state of the fluid according to the state of the boundary layer of the airflow at the surface of the body.

Also, the boundary layer separating portion may be a plate member that is provided parallel to, a certain distance away from, the surface of the body. In this case, the main flow and the boundary layer of the airflow at the surface of the body are able to be mechanically separated by the plate member provided on the surface of the body.

Also, the ejecting portion may be provided on a rear end of the boundary layer separating portion. The main flow and the boundary layer of the airflow at the surface of the body are separated by the boundary layer separating portion, so providing the ejecting portion on a rear end portion of the boundary layer separating portion enables fluid to be reliably ejected between the main flow and the boundary layer of the airflow at the surface of the body.

Thus, the boundary layer control system according to this aspect of the invention is able to inhibit a decrease in velocity of a main flow of an airflow at a body surface of a moving object.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
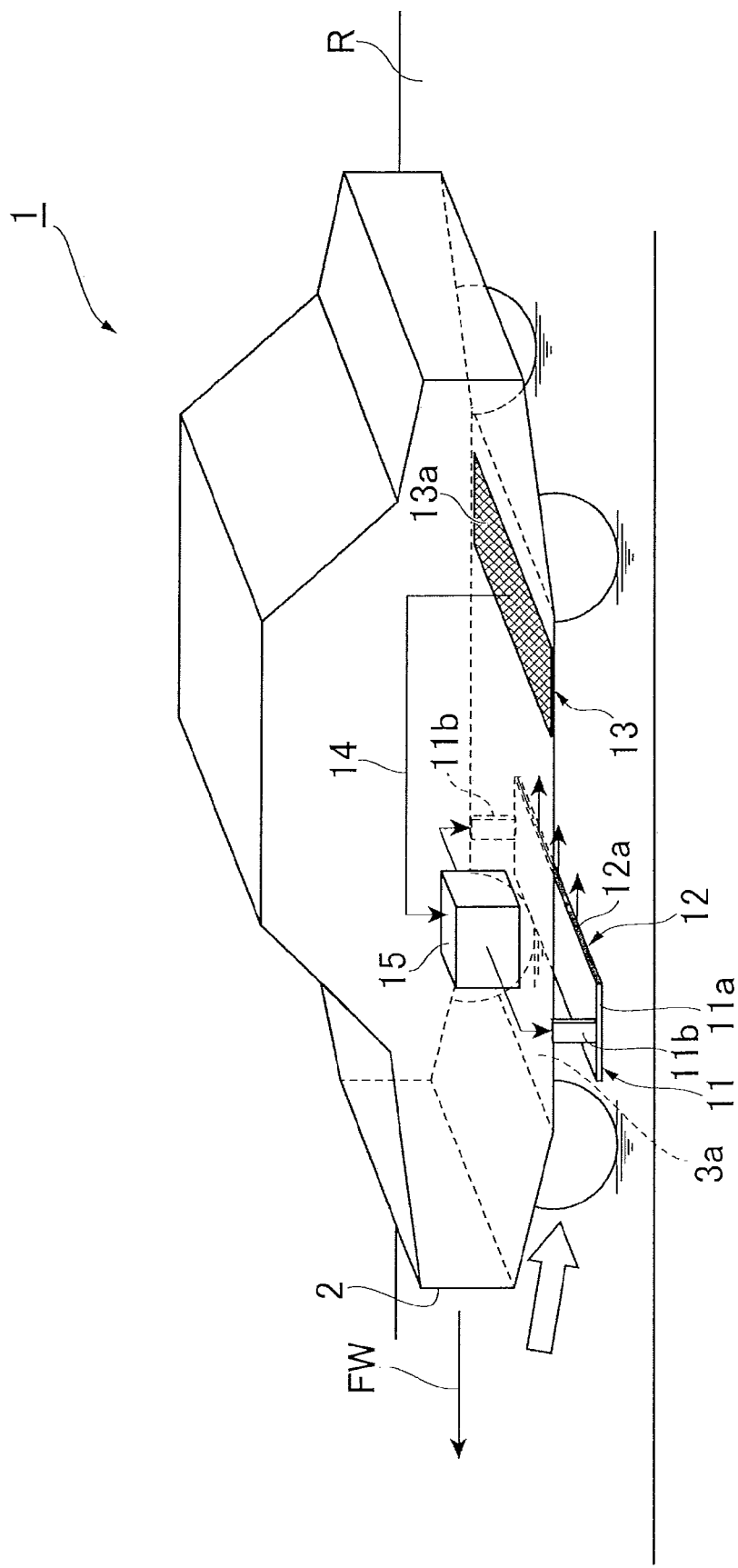
FIG. 1 is a block diagram schematically showing a boundary layer control system according to an example embodiment of the invention.

A boundary layer control system according to example embodiments of the invention will now be described in detail with reference to the drawings. In the description of the drawings, like or corresponding portions will be denoted by the same reference characters; and redundant descriptions will be omitted.

FIG. 1 is a block diagram of a boundary layer control system according to one example embodiment of the invention. The boundary layer control system is a system that is mounted to a moving object, for separating an airflow generated around the moving object as a result of the moving object moving, into a main flow that has a uniform fluid velocity, and a boundary layer that is formed near a surface of the moving object and has a lower fluid velocity than the main flow does. As shown in FIG. 1, the boundary layer control system 1 is provided opposite an underside 3a (i.e., a surface) of a body 2 of a vehicle, for example, and includes a boundary layer separating portion 11 and an ejecting portion 12. In the description below, up, down, front, rear, and left and right with respect to the boundary layer control system 1 refer to directions when the body 2 side is up, a road surface R is down, a side in the forward direction FW is toward the front, and a side opposite the forward direction FW is toward the rear.

The boundary layer separating portion 11 has a structure for separating the airflow generated around moving object into a boundary layer and a main flow. More specifically, the boundary layer separating portion 11 is provided with a boundary layer separating plate 11a that is arranged parallel to the underside 3a, and a pair of support members 11b for attaching the boundary layer separating plate 11a to the underside 3a, for example. The boundary layer separating plate 11a is a hollow plate member that extends in the left-right direction of the underside 3a, and is provided a predetermined distance away from the underside 3a so as to be positioned near the boundary between the main flow and the boundary layer of the airflow at the underside 3a. Hereinafter, the main flow and the boundary layer of the airflow may also be simply referred to as "main flow" and "boundary layer", respectively. The support members 11b are tube-shaped members that connect both end portions in the left-right direction of the boundary layer separating plate 11a to the underside 3a. Here, "parallel to the underside 3a" includes substantially parallel to the underside 3a to an extent in which the boundary layer separating plate 11a is able to mechanically separate the boundary layer from the main flow, and there is almost no resistance from the airflow generated around the moving object.

The ejecting portion 12 ejects fluid in a state different from that of the boundary layer and the main flow, between the boundary layer and the main flow that have been separated by the boundary layer separating portion 11. The fluid ejected from the ejecting portion 12 is such that at least one of a fluid velocity, a fluid temperature, and a fluid pressure when the fluid is ejected, for example, differs from that of the boundary layer and the main flow. Also, the ejecting portion 12 is provided on a rear end of the boundary layer separating plate 11a, for example. In this case, the ejecting portion 12 has a plurality of slits 12a provided in the left-right direction in the rear end of the boundary layer separating plate 11a, and ejects fluid from this plurality of slits 12a. The fluid ejected by this ejecting portion 12 has a state different from that of the boundary layer and the main flow, so a fluid layer is formed between the boundary layer and the main layer by this fluid.

The fluid that is ejected from the ejecting portion 12 preferably has a higher energy than the main flow and the boundary layer of the airflow generated around the moving object. When fluid having a higher energy than the main flow and the boundary layer is ejected between the boundary layer and the main flow in this way, a fluid layer having a high energy is consequently formed. This fluid layer functions as an air curtain, which inhibits the main flow from reattaching to the boundary layer. Here, the energy may be kinetic energy (velocity), or internal energy from temperature or pressure or the like. This kind of internal energy is converted into kinetic energy at some stage, so fluid having higher internal energy than the internal energy of the boundary layer and the main flow functions similarly to fluid having higher kinetic energy than the kinetic energy of the boundary layer and the main flow.

The boundary layer control system 1 may also include a suction portion 13, a flow path portion 14, and a control portion 15.

The suction portion 13 is provided on the underside 3a behind (i.e., to the rear of) the boundary layer separating portion 11, and sucks in the fluid included in the boundary layer. This suction portion 13 is preferably provided in a position where the state of the fluid ejected by the ejecting portion 12 is changed by the boundary layer and the main flow, and the force that inhibits the main flow from reattaching to the boundary layer starts to decrease. Also, the suction portion 13 extends in the left-right direction of the underside 3a and has a plurality of suction holes 13a. The suction portion 13 sucks in the fluid near the underside 3a into the body 2 via this plurality of suction holes 13a. The flow path portion 14 is a path that leads the fluid that has been sucked in by the suction portion 13 out to the control portion 15, and is formed by a duct, for example.

The control portion 15 controls the state of the fluid led out by the flow path portion 14, based on the state of the boundary layer. The control portion 15 has a compressor fan and a heater and the like, for example. Also, the control portion 15 compresses the fluid led out by the flow path portion 14 so that it has a higher pressure than the fluid pressure of the main flow and the boundary layer near the underside 3a, for example, according to the state of the boundary layer near the underside 3a. Also, the control portion 15 heats the fluid led out by the flow path portion 14 so that it has a higher temperature than the fluid temperature of the main flow and the boundary layer near the underside 3a, for example, according to the state of the boundary layer near the underside 3a.

Also, the control portion 15 supplies the controlled fluid to the boundary layer separating plate 11a via the pair of support members 11b provided on the underside 3a, and ejects it (i.e., the controlled fluid) with the ejecting portion 12 provided on the rear end of the boundary layer separating plate 11a. Various states, such as the fluid velocity, the fluid temperature, and the fluid pressure and the like, of the main flow and the boundary layer near the underside 3a are detected by sensors or the like, or are estimated based on the moving velocity and the like of the moving object.

With the boundary layer control system 1 structured in this way, when the vehicle moves in the forward direction FW, an airflow in a state in which the main flow and the boundary layer are connected in a continuous fashion consequently flows into the boundary layer separating portion 11 from the front. This airflow is then mechanically separated into the main flow and the boundary layer by the boundary layer separating portion 11, and the separated main flow and boundary layer each flow out behind the boundary layer separating portion 11. Next, fluid in a state different from that of the boundary layer and the main flow is ejected between the separated boundary layer and main flow, by the ejecting portion 12 provided on the rear end of the boundary layer separating portion 11.

Also, fluid included in the separated boundary layer is sucked in by the suction portion 13 provided toward the rear of the underside 3a, and led out to the control portion 15 via the flow path portion 14. Continuing on, the fluid that has been led out to the control portion 15 is controlled, e.g., pressurized and heated, in the control portion 15, and supplied to the boundary layer separating plate 11a via the pair of support members 11b. Then the fluid supplied to the boundary layer separating plate 11a is ejected from the slits 12a of the ejecting portion 12. As described above, with the boundary layer control system 1, fluid included in the boundary layer is circulated and used.

Figure 2:
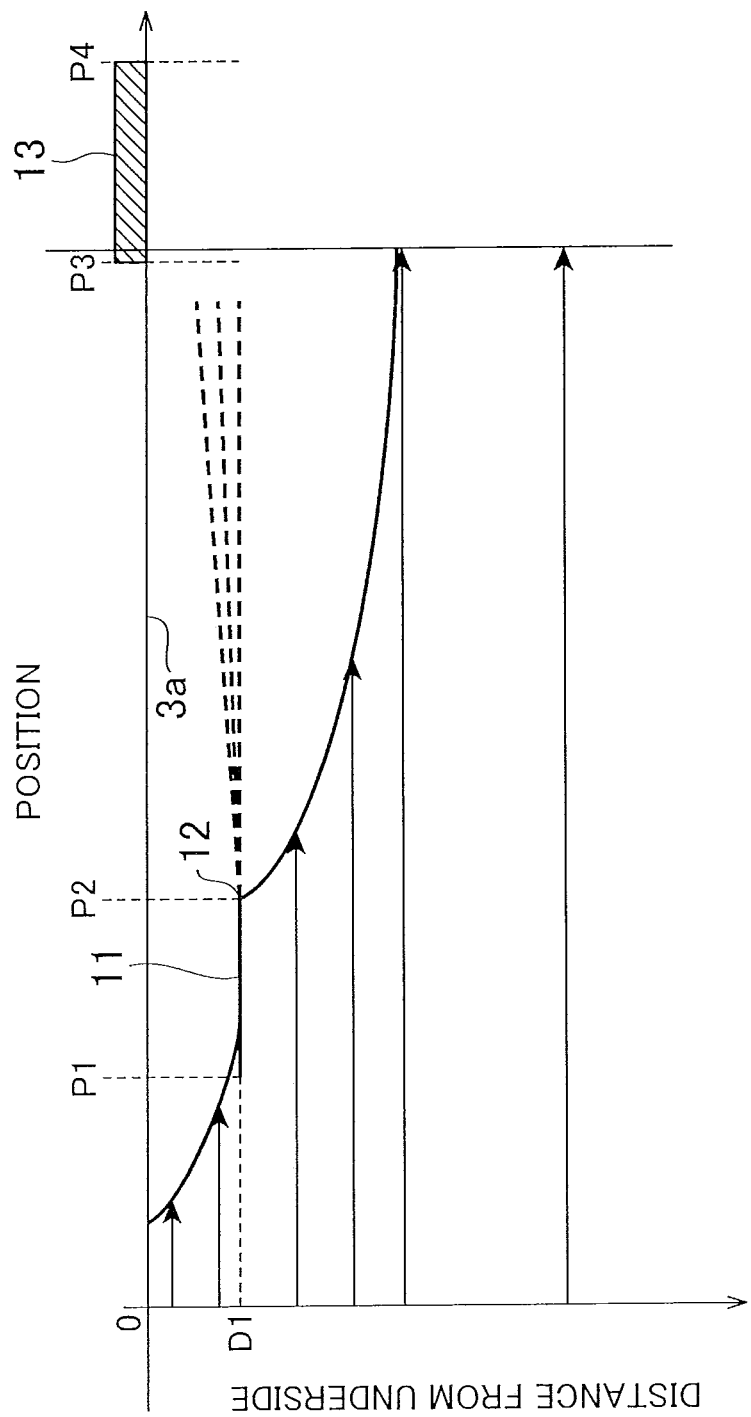
FIG. 2 is a view illustrating an airflow under a body in FIG. 1.
Figure 3:
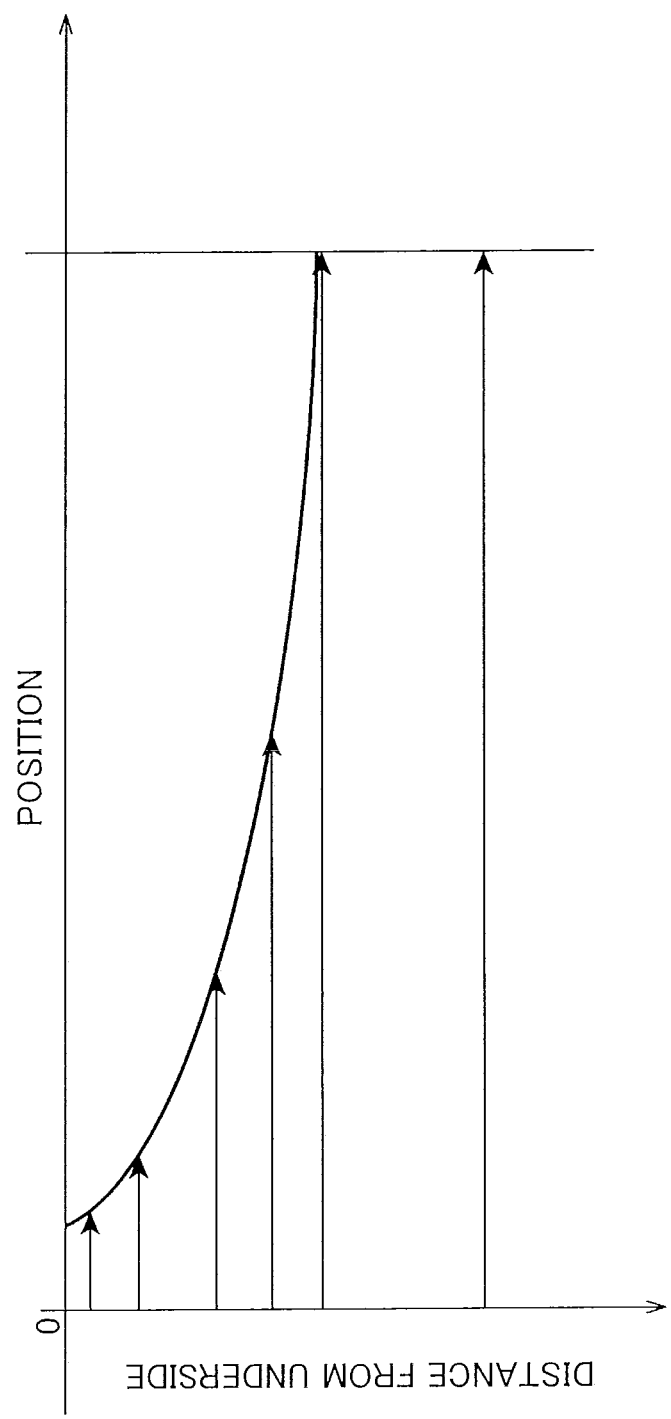
FIG. 3 is a view illustrating an airflow under a body in a comparative example.

Next, the operation and effects of the boundary layer control system 1 will be described with reference to FIGS. 2 and 3. FIG. 2 is a view illustrating the airflow under the underside 3a of the body 2 of a vehicle provided with the boundary layer control system 1. FIG. 3 is a view illustrating the airflow under an underside of a body of a vehicle not provided with the boundary layer control system 1. In FIGS. 2 and 3, the horizontal axis represents the position in the longitudinal direction of the vehicle, with 0 being the position of a front end of the underside. Also, the vertical axis represents the distance in the vertical direction from the underside, with 0 being the height of the underside.

As shown in FIG. 3, with a related vehicle, the airflow under the underside of the vehicle is such that a boundary layer formed near the underside and a main flow formed in a position a certain distance or more away from the underside are connected in a continuous fashion. This boundary layer is dragged by the vehicle by viscosity, such that the velocity of the boundary layer is low. Farther away from the underside, the effect of viscosity on the boundary layer is less, so the velocity of the boundary layer increases. On the other hand, the main flow is almost unaffected by viscosity, so the velocity of the main flow is substantially the same as the vehicle speed. However, with the related vehicle, the boundary layer and the main flow are not reliably separated, so the main flow tends to attach to the boundary layer farther toward the rear, causing the velocity of the main flow to decrease due to the boundary layer. If the velocity of the main flow decreases due to the boundary layer in this way, down force is reduced, so stability of the vehicle body may be lost.

Also, with the related vehicle, the main flow and the boundary layer are connected in a continuous fashion, so the boundary layer and the main flow are unable to be reliably separated by only sucking in the boundary layer, and consequently, the main flow is affected by viscosity. Moreover, the airflow has a tendency to reattach, so the main flow reattaches to the body (i.e., the underside). Therefore, in order to sufficiently suck in the boundary layer, a suction portion that is wide (i.e., that covers a large area) or long (i.e., that extends over a long distance) is necessary.

On the other hand, as shown in FIG. 2, with the vehicle provided with the boundary layer control system 1, the airflow under the underside 3a of the body 2 is such that, from the front end of the underside 3a to a position P1, a boundary layer formed near the underside 3a is connected in a continuous fashion to a main flow formed in a position a certain distance or more away from the underside 3a, similar to the vehicle of the related art. However, with the boundary layer control system 1, the boundary layer separating portion 11 is provided in a position a distance D1 away from the underside 3a in the vertical direction, from the position P1 to a position P2 in the longitudinal direction. Therefore, the airflow under the underside 3a is mechanically separated into the boundary layer on the underside 3a side and the main flow on the road surface R side by this boundary layer separating portion 11.

Also, at the position P2 in the longitudinal direction, fluid in a state different than that of the boundary layer and the main flow is ejected by the ejecting portion 12, between the boundary layer and the main flow that have been separated by the boundary layer separating portion 11. This ejected fluid forms a fluid layer to the rear of the position P2, and this fluid layer functions as an air curtain. That is, the main flow is able to be inhibited from reattaching to the boundary layer by the fluid that is in a state different than that of the boundary layer and the main flow being ejected between the boundary layer and the main flow. As a result, at the underside 3a, a decrease in the velocity of the main flow is able to be inhibited, so the velocity of the main flow is maintained at substantially the same velocity as the vehicle speed until the rear end of the underside 3a.

Furthermore, the boundary layer control system 1 includes the suction portion 13 that extends in the left-right direction from a position P3 to a position P4 in the longitudinal direction. The position P3 is a position where the state of the fluid ejected by the ejecting portion 12 is changed by the boundary layer and the main flow and the like, and the force inhibiting the main flow from reattaching to the boundary layer begins to decrease. The fluid included in the boundary layer to the rear of the position P3 is sucked in by this suction portion 13. Therefore, to the rear of the position P3, a decrease in the velocity of the main flow due to the boundary layer is able to be inhibited. That is, the boundary layer control system 1 first mechanically separates the boundary layer from the main layer with the boundary layer separating portion 11, and then to the rear of this, keeps the main flow separate from the boundary layer by the air curtain of the ejected fluid, and even further to the rear, inhibits the main flow from attaching to the boundary layer, and thus slowing down (i.e., decreasing in velocity), by sucking in the boundary layer with the suction portion 13.

In this way, the boundary layer control system 1 extends over a wide area from the front end to the rear end of the underside 3a, and separates the main flow from the boundary layer, thus reducing the percentage of the main flow that is dragged by the boundary layer and thus slowed down (i.e., reduced in velocity). As a result, under the underside 3a, a decrease in down force is able to be inhibited, so stability of the vehicle body can be improved. For example, vehicle vibration from a rough road surface R and rolling during sudden steering and the like can be reduced.

Also, with the related vehicle, the pressure of the airflow under the underside is reduced by the Venturi effect. Therefore, in order to suck in the fluid included in the boundary layer, the pressure of the airflow under the underside must be reduced so that it is even lower than the pressure of the fluid, so a large driving force is needed. In contrast, in a vehicle provided with the boundary layer control system 1, the flowrate of the boundary layer that has been separated from the high-velocity main flow is further reduced, so the pressure of the boundary layer recovers (i.e., negative pressure is weakened). Therefore, the driving force needed to suck in the fluid included in the boundary layer can be reduced.

Also, with the boundary layer control system 1, the fluid sucked in by the suction portion 13 is used as the fluid that is ejected by the ejecting portion 12, so a conduit for discharging the fluid sucked in by the suction portion 13 is no longer necessary.

Moreover, the boundary layer control system 1 is able to control the state of the fluid that is ejected from the ejecting portion 12, using the control portion 15. For example, the control portion 15 may also eject fluid of a higher velocity than the flowrate of the boundary layer and the main flow from the ejecting portion 12. In this case, a fluid layer is formed between the boundary layer and the main flow by the fluid of a higher velocity than the flowrate of the boundary layer and the main flow. This fluid layer makes it possible to divide a flow in which the main flow tries to reattach to the boundary layer, and thus makes it possible to separate the main flow from the boundary layer.

Also, the control portion 15 may compress the fluid using a compressor fan, and supply fluid of a higher pressure than that of the boundary layer and the main flow to the ejecting portion 12. In this case, compressing the fluid makes it possible to increase the flowrate of the fluid. Also, a fluid layer is formed between the boundary layer and the main flow by a fluid of a higher pressure and a faster flowrate than the flowrate of the boundary layer and the main flow. This fluid layer has a higher pressure than that of the boundary layer and the main flow, so a flow in the direction from the fluid layer toward the boundary layer and the main flow is created. Therefore, the boundary layer can be separated from the main flow.

Also, the control portion 15 may heat the fluid with a heater and supply fluid of a temperature higher than that of the boundary layer and the main flow to the ejecting portion 12. Typically, high-temperature fluid creates a layer up high, and low-temperature fluid creates a layer down low. Accordingly, fluid that has been heated by heating or the like forms a layer near the underside 3a, and the main flow forms a layer on the road surface R side. Therefore, the main flow can be separated from the boundary layer or the underside 3a by the fluid layer from the high-temperature fluid. Further, the heated fluid collects near the underside 3a, and is therefore sucked in by the suction portion 13 and reused. In this case, the fluid that has already been heated is reheated by the heater, so the electric power needed to obtain fluid of a higher temperature than the fluid temperature of the boundary layer and the main flow is able to be reduced compared with when heating fluid that is at normal temperature.

The boundary layer control system according to the invention is not limited to the example embodiments described above. For example, the boundary layer control system 1 is not limited to being mounted on a vehicle, but may mounted in any of a variety of moving objects such as an aircraft or the like. Also, the boundary layer control system 1 is not limited to being provided on an underside of a body of a moving object, but may be provided on a surface of a body of a moving object. At the boundary layer of the airflow at the body surface of the moving object, shearing force from viscosity becomes a cause of airflow resistance against the moving object, such that the moving object decelerates. Therefore, separating the airflow into the boundary layer and the main flow at the body surface of the moving object enables a decrease in the velocity of the main flow to be inhibited, thus enabling resistance from the airflow to be decreased. As a result, fuel efficiency and the like are able to be improved.

Moreover, the ejecting portion 12 may also eject a stream of air in a different state between the underside 3a and the main flow that has been separated by the boundary layer separating portion 11. Alternatively, the ejecting portion 12 may eject a stream of air in a different state between the body to which the boundary layer control system 1 is mounted and the main flow that has been separated by the boundary layer separating portion 11. In this case, the main flow that has been separated by the boundary layer separating portion 11 is able to be inhibited from reattaching to the body (i.e., the underside), so the percentage of the main flow that is dragged by the body and thus slowed down (i.e., reduced in velocity) is able to be decreased.

Further, the control portion 15 may control the ejecting portion 12 to change the direction in which the fluid is ejected, according to the state of the boundary layer. More specifically, when the moving velocity of the moving object is low, the control portion 15 may control the ejecting portion 12 to eject fluid toward the body 2 side (i.e., the boundary layer), and as the moving velocity increases, the control portion 15 may control the ejecting portion 12 to eject fluid so that it gradually comes to be parallel to the surface of the body 2. For example, the ejecting portion 12 may be made of resin, and the direction in which the fluid is ejected may be controlled by elastically deforming the ejecting portion 12. According to this structure, when the moving velocity of the moving object is low, the velocity of the ejected fluid is sufficiently large, so the velocity of the boundary layer can be increased by ejecting the fluid directly at the boundary layer. On the other hand, when the moving velocity of the moving object is high, the airflow can be separated into the boundary layer and the main flow by ejecting the fluid parallel to the surface of the body of the moving object. Also, the control portion 15 may perform only one fluid control, such as pressurizing, heating, or changing the direction of ejection, for example, or may perform a plurality of controls in combination.

The invention claimed is:

1. A boundary layer control system comprising:
a boundary layer separating portion that separates a boundary layer of an airflow at a surface of a body of a moving object from a main flow of the airflow;
an ejecting portion that ejects fluid in a state different from that of the boundary layer and the main flow, between the boundary layer and the main flow that have been separated by the boundary layer separating portion;
a suction portion that is provided behind the boundary layer separating portion in a longitudinal direction of the moving object, and sucks in fluid included in the boundary layer, wherein the ejecting portion ejects the fluid sucked in by the suction portion, between the boundary layer and the main flow; and
wherein the ejecting portion is provided on a rear end of the boundary layer separating portion and the suction portion is provided behind the ejecting portion in the longitudinal direction of the moving object.

2. The boundary layer control system according to claim 1, wherein the ejecting portion ejects fluid in which at least one of a fluid velocity, a fluid pressure, and a fluid temperature is different from that of the boundary layer and the main flow, between the boundary layer and the main flow.

3. The boundary layer control system according to claim 1 further comprising a control portion that controls the state of the fluid sucked in by the suction portion and supplies the resultant fluid to the ejecting portion.

4. The boundary layer control system according to claim 3, wherein the control portion compresses the fluid sucked in by the suction portion, based on the state of the boundary layer.

5. The boundary layer control system according to claim 3, wherein the control portion heats the fluid sucked in by the suction portion, based on the state of the boundary layer.

6. The boundary layer control system according to claim 3, wherein the control portion controls the ejecting portion to change a direction in which the fluid is ejected, based on the state of the boundary layer.

7. The boundary layer control system according to claim 1, wherein the boundary layer separating portion is a plate member that is provided parallel to, a certain distance away from, the surface of the body.

8. The boundary layer control system according to claim 1, wherein the moving object is a vehicle, and the surface of the body is an underside of the vehicle.

\* \* \* \* \*